United States Patent [19]
Nakamura et al.

[11] Patent Number: 5,092,331
[45] Date of Patent: Mar. 3, 1992

[54] FLUORESCENCE ENDOSCOPY AND ENDOSCOPIC DEVICE THEREFOR

[75] Inventors: Kazunari Nakamura, Hachioji; Keiichi Hiyama, Akishima; Takao Tsuruoka, Hachioji; Tetsuo Nonami, Tama, all of Japan

[73] Assignee: Olympus Optical Co., Ltd., Tokyo, Japan

[21] Appl. No.: 397,812

[22] Filed: Aug. 24, 1989

[30] Foreign Application Priority Data

Jan. 30, 1989 [JP] Japan .................................. 1-20245
May 15, 1989 [JP] Japan ................................. 1-120872

[51] Int. Cl.$^5$ .......................... A61B 1/06; A61B 5/00
[52] U.S. Cl. ....................................... 128/634; 128/6; 128/665
[58] Field of Search ........................... 128/6, 634, 665; 436/172

[56] References Cited

U.S. PATENT DOCUMENTS

| | | | |
|---|---|---|---|
| 4,541,438 | 9/1985 | Parker et al. | 128/664 |
| 4,742,388 | 5/1988 | Cooper et al. | 358/98 |
| 4,768,089 | 8/1988 | Kato | 358/98 |
| 4,821,117 | 4/1989 | Sekiguchi | 358/98 |
| 4,961,110 | 10/1990 | Nakamura | 358/98 |
| 4,998,973 | 3/1991 | Kikuchi | 128/6 |

OTHER PUBLICATIONS

"Basic Study on Photochemical Effect of Pheophorbide a Irradiated by Nd:YAG Laser Light", Mashiko et al., *Journal of Japan Society of Laser Medicine*, vol. 6, No. 3, published Jan. 1986, pp. 113–116.

Primary Examiner—William E. Kamm
Assistant Examiner—Kevin Pontius
Attorney, Agent, or Firm—Armstrong, Nikaido, Marmelstein, Kubovcik & Murray

[57] ABSTRACT

A fluorescence endoscopy and an endoscopic device therefor, wherein, to an object to be examined containing a fluorescent substance, light rays in a plurality of wavelength ranges whose degrees of exciting the fluorescent substance are different from one another and which can constitute a color images are sequentially irradiated; images of the object are obtained by the respective wavelength ranges; a color image of the object is constituted using the images obtained by the respective wavelength ranges and information based on fluorescence emitted by the fluorescent substance, is obtained using at least an image obtained by a wavelength whose degree of exciting the fluorescent substance is largest out of the images obtained by the respective wavelength ranges.

33 Claims, 14 Drawing Sheets

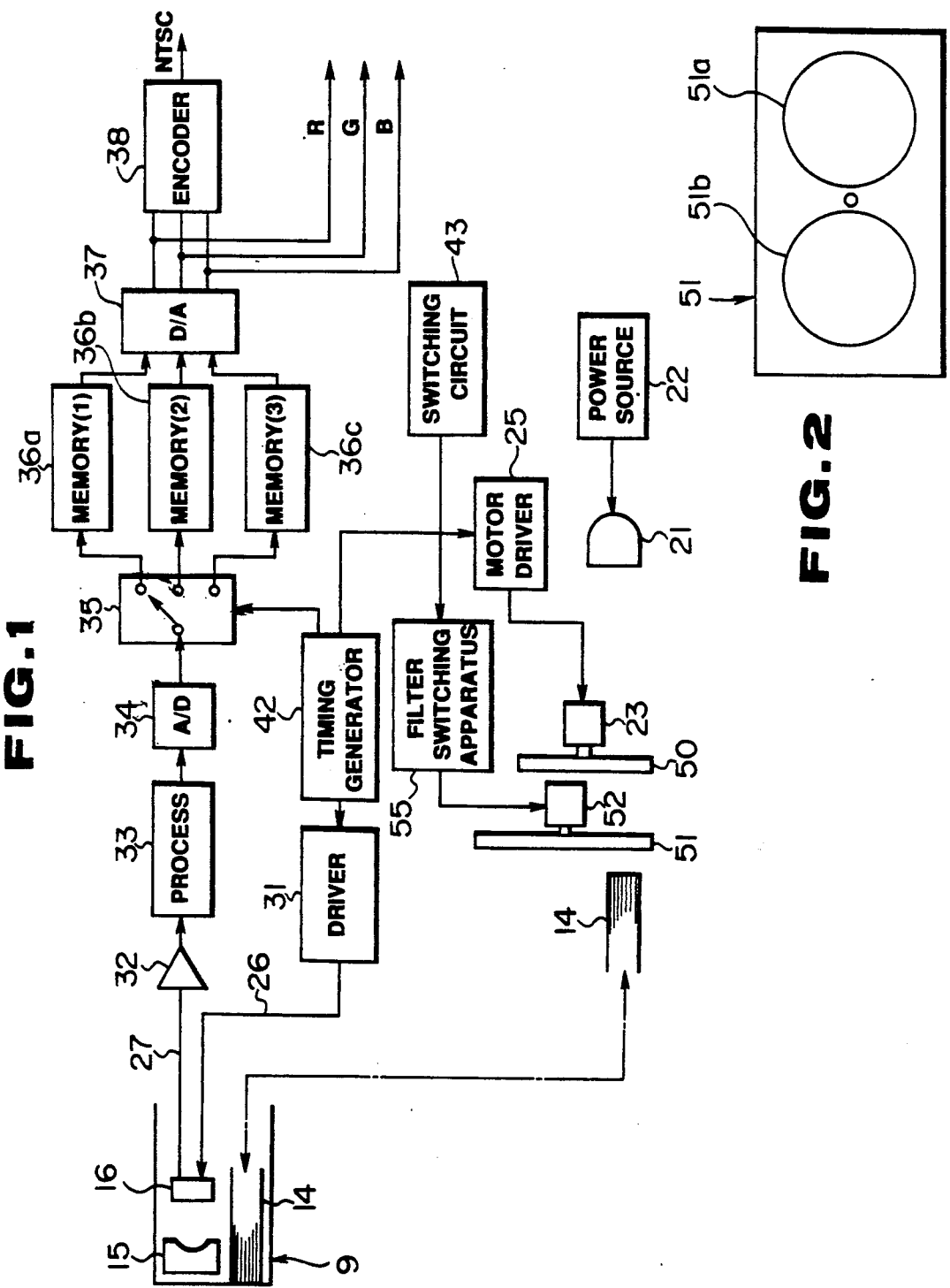

FIG.20(A) FIG.20(B)
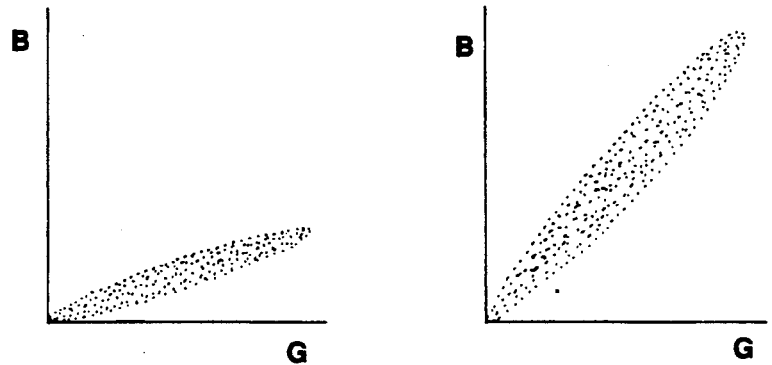
FIG.21
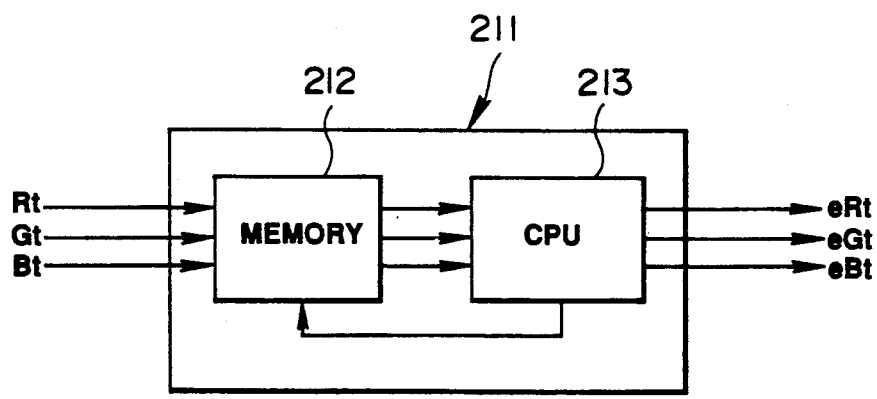

FLUORESCENCE ENDOSCOPY AND ENDOSCOPIC DEVICE THEREFOR

BACKGROUND OF THE INVENTION

1. Field of the Invention

This invention relates to a fluorescence endoscopy and an endoscopic device therefor, by which, while irradiating a ray of exciting light to an object to be examined containing a fluorescent substance, information on fluorescence emitted by the object is obtained.

2. Related Art Statement

In recent years, an endoscope is in wide use as it can observe organs or the like in a venter by inserting a thin, long inserting portion in the venter, or it can make various treatments by inserting, as the case may require, various treatment tools into a treatment tool channel provided therein.

Many different types of electronic endoscopes using a solid state imaging device such as a charge coupled device (CCD) as imaging means have also been proposed.

As a method for examining organic conditions of man using the endoscope, there is a method for observing fluorescence by which, while giving a fluorescent substance to an object to be examined such as internal organs and irradiating a ray of exciting light to the object, a fluorescent image formed by fluorescence emitted by the fluorescent substance is observed, as disclosed, for example, in Japanese Patent Unexamined Publication No. 63-122421 or in U.S. Pat. No. 4,821,117.

However, the conventional method required a special light source for emitting the exciting light ray and special imaging means for observing the fluorescent image. Thus, in order to obtain both an ordinary image in the visible range and a fluorescent image, as disclosed in the Japanese Patent Unexamined Publication No. 63-122421 and in the U.S. Pat. No. 4,821,117, it was necessary to make a switching operation between the exciting light and the light for ordinary observation, and this made it difficult to observe a chronological change, for example, in fluorescence produced after a phleboclysis of the fluorescent substance has been made. The arrangement of the device was also complicated so as to obtain both the ordinary image in the visible range as well as in the fluorescent image.

Fluorescent substances such as fluorescein and adriamycin generally have their absorption range in the shorter wavelength side, whereas their fluorescence range is in the longer wavelenght side. Further, the endoscopic image is generally strong in the red wavelength. As a result, when trying to observe fluorescence simultaneously with the ordinary image, fluorescence emitted by the endoscopic object is buried in the endoscopic image, because fluorescence is in the longer wavelength side, or in other words, is close to red, thus the fluorescence has not been well identified.

In order to solve this problem, what is conceivable is to apply an enhancing process to a range of wavelengths of fluorescence. However, since fluorescence is close to red as described above, it is difficult to make a relative difference with respect to the original red part of the endoscopic object, and thus it is not possible to obtain a successful enhancing effect.

OBJECT AND SUMMARY OF THE INVENTION

The object of this invention is to provide a fluorescence endoscopy and an endoscopic device therefor, which, by making it possible not only to make an ordinary observation but also to obtain information based on fluorescence emitted by a fluorescent substance with a simple constitution, allow a chronological change in the fluorescence-based information to be observed.

Another object of this invention is to provide a fluorescence endoscopy and an endoscopic device therefor, which allow fluorescence to be more accurately observed.

The fluroescence endoscopy and the endoscopic device therefor according to this invention is characterized in that, to an object to be examined containing a fluorescent substance, light rays in a plurality of wavelength ranges whose degrees of exciting the fluorescent substance are different from one another and which can constitute a color image are sequentially irradiated. Images of the object are obtained by the respective wavelength ranges. A color image of the object is constituted using the images obtained by the respective wavelength ranges. Information based on fluorescence emitted by the fluorescent substance is obtained using at least an image obtained by a wavelength whose degree of exciting the fluorescent substance is largest out of the images obtained by the respective wavelength ranges.

The other features and advantages of this invention will be fully apparent from the following description.

BRIEF DESCRIPTION OF THE DRAWINGS

FIGS. 1 to 7 relate to a first embodiment of the invention;

FIG. 1 is a block diagram showing the constitution of an endoscopic device;

FIG. 2 is an explanatory drawing of a bandpass limiting filter unit;

FIG. 3 is a side elevation showing the general view of the endoscopic device;

FIG. 4 is a characteristic chart showing ranges of wavelengths transmitted by respective filters of a rotary filter;

FIG. 5 is a characteristic chart showing ranges of wavelengths transmitted by one of filters of the bandpass limiting filter unit;

FIG. 6 is a characteristic chart showing absorption and fluorescence characteristics of fluorescein;

FIG. 7 is a block diagram showing a process circuit for observing and measuring the density distribution of a fluorescent substance;

FIG. 8 is a characteristic chart showing absorption and fluorescence characteristics of adriamycin;

FIG. 9 is a characteristic chart showing ranges of wavelengths transmitted by respective filters of a rotary filter;

FIG. 10 is a characteristic chart showing absorption and fluorescence characteristics of a hematoporphyrin derivative as another example of a fluorescent substance;

FIG. 11 is a characteristic chart showing absorption and fluorescence characteristics of pheophorbide a;

FIG. 12 is a characteristic chart showing ranges of wavelengths transmitted by respective filters of a rotary filter;

FIG. 15 is a block diagram showing the constitution of an endoscopic device;

FIG. 16 is a functional block diagram of a central processing unit;

FIGS. 17 (A)~(D) are two-dimensional histograms for G and B of an endoscopic image before an enhancing process;

FIGS. 18 (A)~(D) are two-dimensional histograms for G and B of an endoscopic images after an enhancing process;

FIGS. 19 to 22 relate to a seventh embodiment of the invention:

FIG. 19 is a block diagram showing the main feature of an endoscopic device;

FIG. 20 (A) is an explanatory drawing showing a relationship between B and G before an enhancing process;

FIG. 20 (B) is an explanatory drawing showing a relationship between B and G after an enhancing process;

FIG. 21 is a block diagram showing the constitution of enhancing processing means in a modification of the seventh embodiment; and FIG. 22 is a flowchart showing the operation of the CPU in FIG. 21.

DETAILED DESCRIPTION OF THE PREFERRED EMBODIMENTS

FIGS. 1 to 7 show a first embodiment according to this invention.

Figure 3:
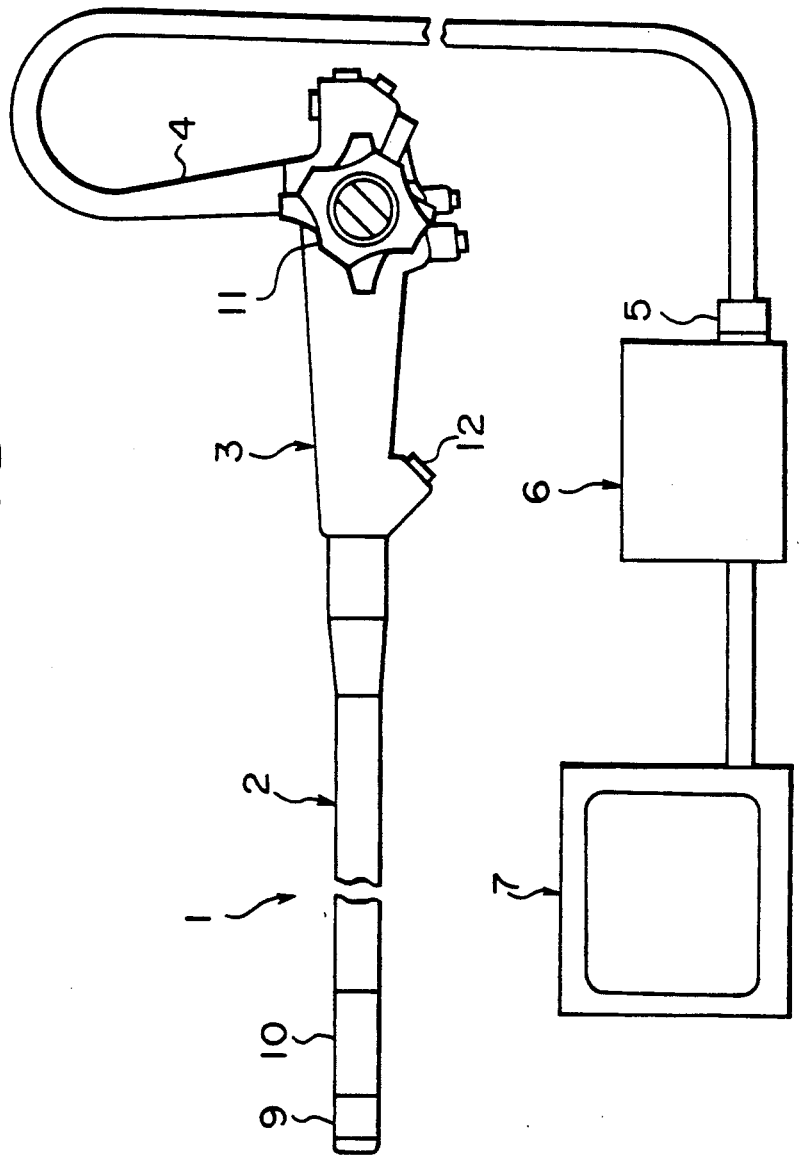

The endoscopic device according to this embodiment comprises an electronic endoscope 1 as shown in FIG. 3. This electronic endoscope 1 has a thin and long, and, for example, flexible inserting portion 2. The rear end of the inserting portion 2 is adjacently provided with an operating section 3 of a large diameter. From the rear end of the operating section 3, a flexible universal cord 4 is laterally extended, and the head end of this cord is provided with a connector 5. The above-mentioned electronic endoscope 1 is arranged so as to be connected, through the connector 5, to a video processor 6 in which a light source device and a signal processing circuit are built. Further, the video processor 6 is so arranged that a monitor 7 is connected thereto.

The head end side of the inserting portion 2 is provided with a hard tip portion 9 and a bendable bend portion 10 which is adjoined in the rear of the tip portion 9 in this order. Also, the bend portion 10 is so constructed as to be bendable in directions, both horizontal and vertical, by rotatably operating a bend operating knob 11 provided on the operating section 3. The operating section 3 is further provided with an inserting inlet 12 which communicates with a treatment tool channel arranged within the inserting portion 2.

As shown in FIG. 1, a light guide 14 for transmitting the irradiated light is inserted into the inserting portion 2 of the electronic endoscope 1. The tip of this light guide 14 is arranged on the tip portion 9 of the inserting portion 2, and from this tip portion 9 the illuminating light can be projected. Further, the light receiving end of the light guide 14 is connected to the connector 5 while inserted into a universal cord 4. The tip portion 9 is further provided with an objective system 15, and a solid state imaging device 16 is arranged at an image forming position of this objective system 15. This solid state imaging device 16 is sensitive for a wide range of wavelengths from ultraviolet to infrared including visible rays. The solid state imaging device 16 is connected to signal lines 26, 27. The signals lines 26, 27 are inserted into the inserting portion 2 and the universal cord 4, and connected to the connector 5.

Figure 4:
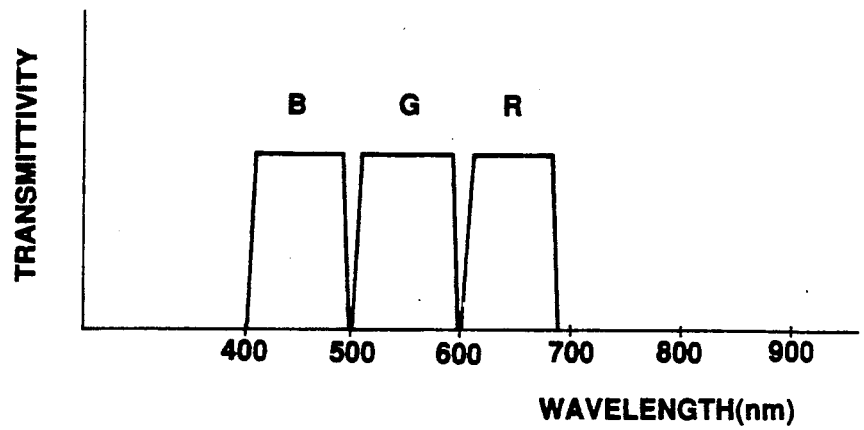

In the video processor 6 there is provided a lamp 21 for emitting light in a wide range of wavelengths including ultraviolet to infrared rays. This lamp 21 may be an ordinary xenon lamp or a stroboscopic lamp. The xenon lamp or the stroboscopic lamp emits large amounts of not only visible light but also ultraviolet and infrared light. This lamp 21 is constructed so that a power source 22 supplies the power thereto. The lamp 21 is provided, at its front end, with a rotary filter 50 which is rotatably driven by a motor 23. This rotary filter 50 is provided, on its circumference, with filters which transmit light rays of respective wavelengths of red (R), green (G), and blue (B) therethrough for ordinary observation. Transmission characteristics of the respective filters arranged on the rotary filter 50 are shown in FIG. 4.

Further, the motor 23 is so arranged as to be driven while controlled by a motor driver 25 for the rotation thereof.

Figure 5:
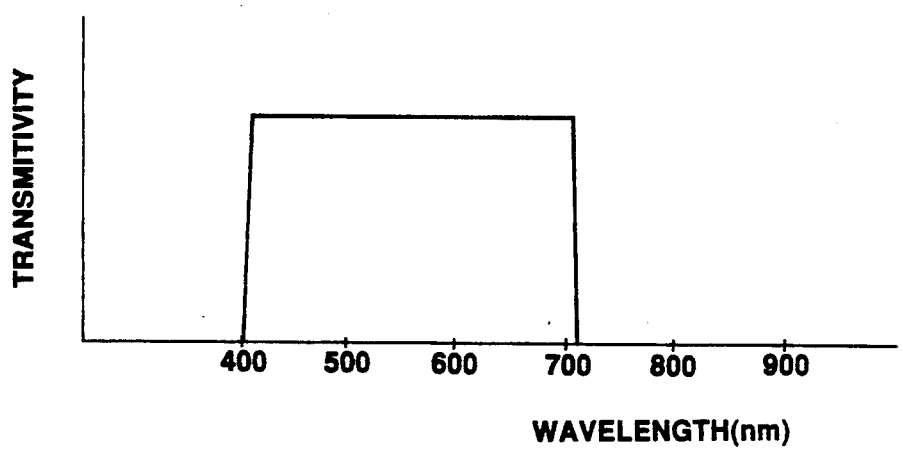

Moreover, on an illuminating light path between the rotary filter 50 and the light receiving end of the light guide 14, a wavelength limiting filter unit 51 is arranged. As shown in FIG. 2, this wavelength limiting filter unit 51 consists of a filter 51a which transmits only light in the visible range therethrough as shown in FIG. 5, and a filter 51b (or hole) which transmits all the light emitted by the lamp 21, or cuts off a range of wavelengths not required for observation and excitation of the fluorescent substance. The wavelength limiting filter unit 51 is so arranged as to be rotated by a motor 52 whose rotation is controlled by a filter switching device 55. Further, the filter switching device 55 is so arranged that it is controlled by a control signal from a switching circuit 43. Upon selection of a wavelength for observation by the switching circuit 43, the motor 52 is rotated so that a filter corresponding to the wavelength for observation selected by the switching circuit 43 out of the respective filters 51a, 51b of the wavelength limiting filter unit 51 is interposed on the illuminating light path, whereby the wavelength limiting filter unit 51 is displaced.

The light, which has been transmitted by the rotary filter 50 and sequentially separated into respective wavelengths R, G, B, is further transmitted by the selected filter of the wavelength limiting filter unit 51, is injected into the light receiving end of the light guide 14, is guided to the tip portion 9 through the light guide 14, is projected from the tip portion 9, and illuminates a part to be observed. A return ray of this illuminating light from the observed part forms an image on the solid state imaging device 16 and undergoes a photoelectric transfer. The solid state imaging device 16 is supplied with a drive pulse from a driver circuit 31 in the video processor 6 through the signal line 26, this drive pulse serving to read and transfer signals present therein. Video signals read from the solid state imaging device 16 are supplied to a pre-amplifier 32 provided either in the video processor 6 or in the electronic endoscope through the signal line 27. The video signals amplified by this pre-amplifier 32 are supplied to a process circuit 33, where they undergo signal processing such as γ-correction and white balance, and are converted to digital signals by an A/D converter 34. These digital video signals are then selectively stored in three memories: memory (1) 36a, memory (2) 36b, memory (3) 36c, respectively corresponding to colors such as red (R), green (G), blue (B). The memory (1) 36a, the memory (2) 36b, the memory (3) 36c are read simultaneously, converted to analog signals by a D/A converter 37, generated therefrom as color signals R, G, B, supplied to an encoder 38, and generated therefrom as an NTSC composite signal.

Then, the color signals R, G, B or the NTSC composite signal are supplied to a color monitor 7, where the observed part is displayed in color.

The video processor 6 is further provided with a timing generator 42 which generates timing for the entire system. The timing generator 42 synchronizes various circuits such as the motor driver 25, the driver circuit 31, and a selecting circuit 35.

In this embodiment, when a wavelength is limited as shown in FIG. 5 by the filter 51a of the wavelength limiting filter unit 51, the wavelengths of the light rays to be emitted by the lamp 21 are sequentially limited by the rotary filter 50, color-separated into light rays R, G, B in the respective wavelength ranges as shown in FIG. 4, and these color-separated light rays are sequentially irradiated to the surface of an organic mucous membrane, and with these light rays an ordinary color image in the visible range is obtained.

Figure 6:
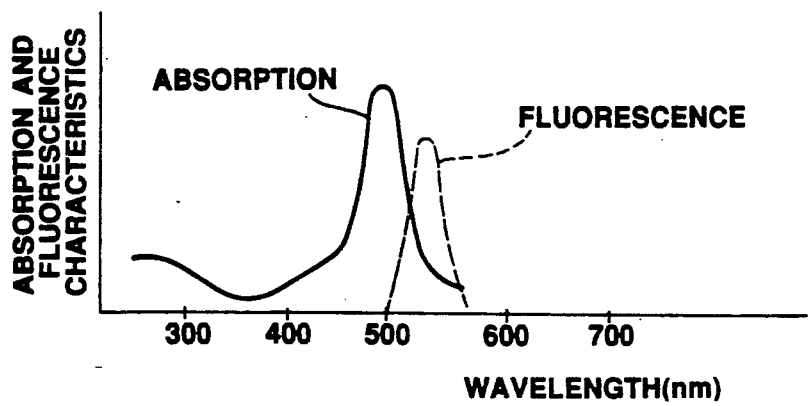

If a phleboclysis of a fluorescent substance as fluorescein having such absorption and fluorescence characteristics as shown in FIG. 6 is made during observation of the organic mucous membrane on the ordinary color image, the density of fluorescein in the blood changes as time elapses. Such a change depends on the change in the bloodstream and the blood volume.

Here, fluorescein has an absorption characteristic almost coincident with the wavelength range of light ray B as shown in FIG. 6 and fluoresces by absorbing this light ray. Thus, when the light rays R, G, B in the respective wavelength ranges are sequentially illuminated by the rotary filter 50, there is weaker fluorescence at the time of illuminating the light rays R, G than at the time of illuminating the light ray B. That is, if the density of fluorescein in the mucous membrane is high at the time of illuminating the light ray B, the mucous membrane fluoresces; however, in signal processing, it is at the time of processing the light ray B when fluorescence is emitted, and as a result, emission of fluorescence by the mucous membrane is processed as a change in the image B with no reference to wavelength ranges of such fluorescence. In other words, a proportion of B in the color image is increased by fluorescence. Thus, a change in color tone may provide an opportunity to observe a fluorescein density distribution and its sequential change.

In this embodiment, it is not always required that the wavelength limiting filter unit 51 be switched to the filter 51b side when observing fluorescence. Nor is the wavelength limiting filter unit 51 always required.

Thus, by observing or measuring a sequential change in the mucous membrane after making a phleboclysis of fluorescein to the mucous membrane, especially a sequential change in the image B and other images G, R, it is possible to grasp circulation behavior of the organic mucous membrane, and thus to improve quality of observing any lesion as well as quality of diagnosis.

Figure 7:
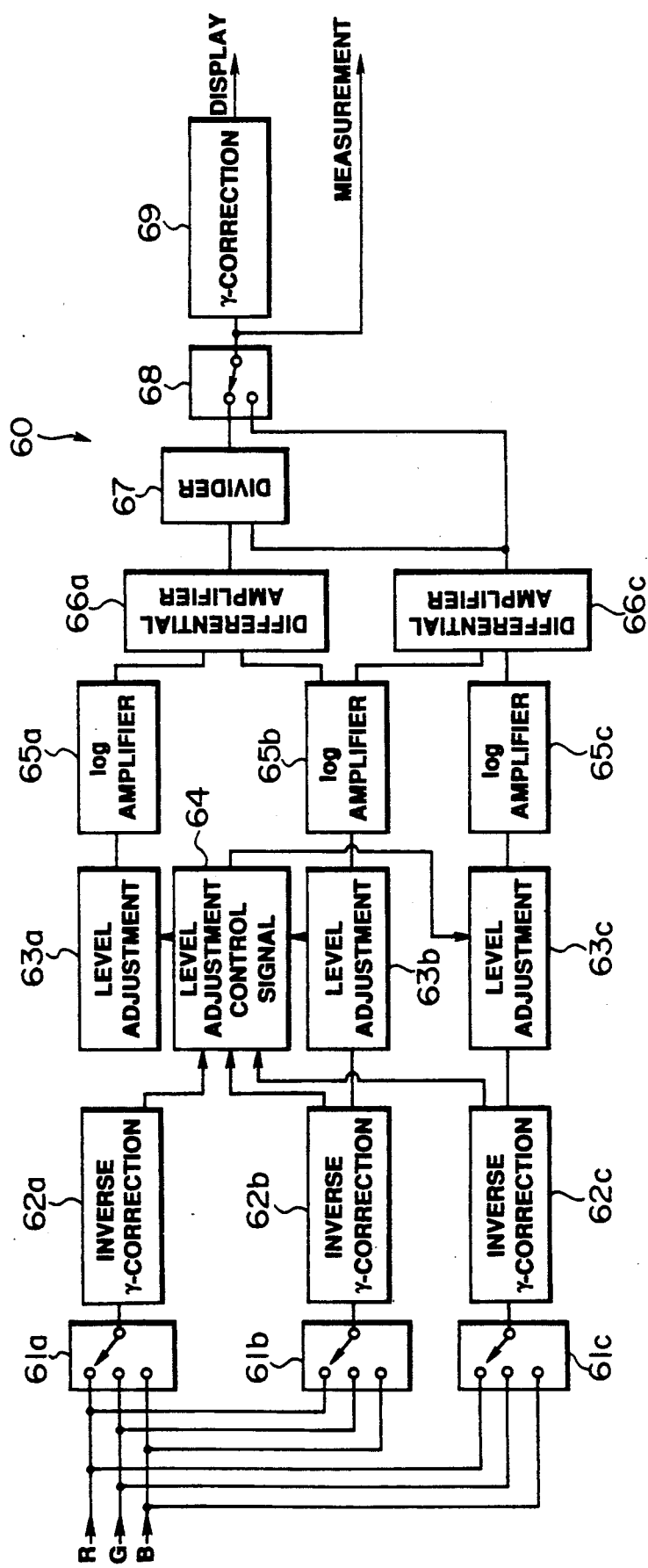

It is further possible to observe and measure the fluorescent substance density distribution by a signal processing circuit as shown in FIG. 7.

This signal processing circuit 60 comprises three three-input-one-output selectors 61a, 61b, 61c, each of which receives an input video signal corresponding to each wavelength. Each of the selectors also selects and supplies an output video signal corresponding to a wavelength which is different from the wavelength thereof. Such outputs of the selectors are supplied to inverse γ-correcting circuits 62a, 62b, 62c. This inverse γ-correction is performed to restore the signals which has been γ-corrected by the video processor 6 to their original state. The outputs of the inverse γ-correcting circuits are respectively supplied to level adjusting circuits 63a, 63b, 63c, in which the levels of the signals are subjected to adjustment by level adjusting control signals from a level adjusting control signal generating circuit 64 to be further subjected to general level adjustment by the three level adjusting circuits 63. Further, the introduction of a logarithmic axis brings the fluorescent substance density and the reflection characteristic into a substantially linear relationship, whereby the outputs of the level adjusting circuits are respectively converted to logarithmic values by log amplifiers 65a, 65b, 65c.

The outputs of the two log amplifiers 65a, 65b out of the three log amplifiers 65a, 65b, 65c are supplied to a differential amplifier 66a, where a difference between the video signals corresponding to a combination of two wavelengths is calculated. Likewise, the outputs of the two log amplifiers 65b, 65c are supplied to a differential amplifier 66c where a difference between video signals corresponding to another combination of two wavelengths is calculated.

The outputs of the differential amplifiers 66a, 66b are supplied to a divider 67, where a predetermined operation (division) is performed. The output of the divider 67 and the output of the differential amplifier 66b are supplied to a two-input selector 68, where one of them is selected and generated as an output therefrom.

In the image formed on making a phleboclysis of fluorescein, a change in the image B with respect to the image R occurs due to a change in the density of the fluorescent substance. Further, since fluorescence changes in accordance with the blood volume, in order to measure the chronological change in the density of fluorescein, it is necessary to normalize the blood volume. The normalization is made on the basis of a blood volume calculated by the image G and the image R. In other words, the selector 61a is caused to select the image B, the selector 61b is caused to select the image R, and the selector 61c is caused to select the image G; a density of the fluorescent substance is calculated from the images G, R by the circuits connected to the differential amplifier 66a; the density of the blood volume is calculated from the images R, G by the circuits connected to the differential amplifier 66c; and a change in the image B is normalized by the density of the blood volume, whereby it is made possible to observe and measure a sequential change in the fluorescent substance density distribution free from any influence by the blood volume.

The output signal of the selector 68 is directly taken up when used for instrumentation, whereas when used for display, it is subjected to a γ-correction by the γ-correcting circuit 69 again, and supplied to the monitor.

Although the signal processing circuit 60 shown in FIG. 7 is provided to serve to perform calculations on a hardware basis, it may be replaced by a software-based processing (that is, a microcomputer).

Thus, according to this invention, it is possible not only to obtain an ordinary color image of an object to be examined on a field sequential basis by sequentially irradiating, to the object containing a fluorescent substance, light rays R, G, B in a plurality of wavelength ranges whose degrees of exciting the fluorescent substance are different from one another and which can constitute a color image, but also to collect fluorescence-based information from a change in the color tone of the color image based on the fact that intensities of fluorescence produced by the respective light rays R, G, B are different from one another.

Further, since exciting light for the observation of fluorescence is included in the light rays to be field-sequentially illuminated for the observation of the ordinary color image, it is not necessary to make a switching operation between the exiting light and the ordinary observation light, whereby the arrangement can be simplified.

Thus, according to this embodiment, it is possible to observe and measure a chronological change in the fluorescence-based information, for example, a timewise change in the state of the examined.

According to this embodiment, it is further possible to observe the fluorescence-based information as a change in the color tone of the color image even in the case where the distribution of the fluorescent substance on the mucous membrane after making a phleboclysis of the fluorescent substance is absent from the wavelength range of visible light.

Figure 8:
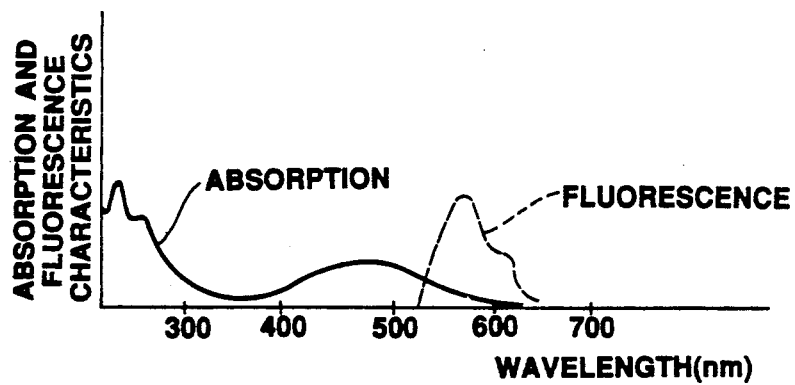
FIGS. 8 to 10 relate to a second embodiment of the invention.
Figure 9:
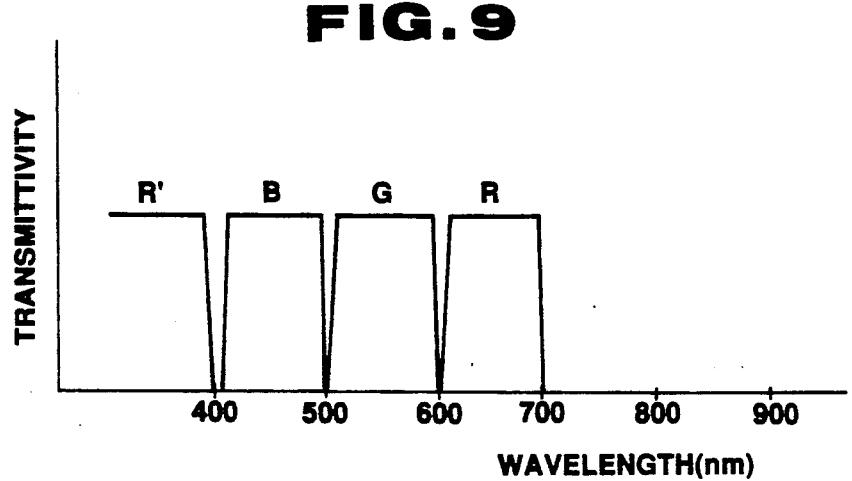
Figure 10:
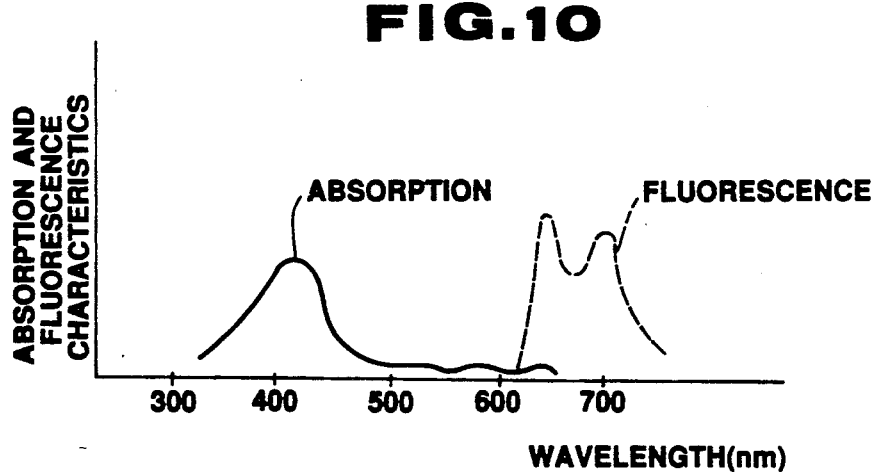

FIGS. 8 to 10 show a second embodiment according to this invention.

This second embodiment is suitable when using adriamycin having such absorption and fluorescence charateristics as shown in FIG. 8 as a fluorescent substance.

When adriamycin is used, the peak of the absorption wavelength is in the ultraviolet range. Therefore, the characteristics of the rotary filter 50 is made such that, as shown in FIG. 9, the filter which transmits R also transmits R′ which is in the ultraviolet range.

Other arrangements are the same as the first embodiment.

According to this embodiment, when a wavelength range is limited as shown in FIG. 5 by the filter 51a of the wavelength limiting filter unit 51, the ordinary light rays R, G, B are field-sequentially irradiated, thus it is possible to observe an ordinary color image.

On the other hand, when the filter 51b of the wavelength limiting filter unit 51 is selected, the object to be imaged is irradiated sequentially by the light rays R including R′, and G, B. Here, if a phleboclysis of adriamycin as a fluorescent substance is made, fluorescence is produced at the time of irradiating the light ray R including R′, thereby allowing a change in the fluorescent substance to be observed and measured as a change in the image R.

The filter which transmits the light ray R′ in the ultraviolet light range may not be limited to the filter which transmits the light ray R, but may be the filters which transmit other light rays G or B.

Other operation and advantages are the same as the first embodiment.

A hematoporphyrin derivative having such absorption and fluorescence characteristics as shown in FIG. 10 may also be used. In this case, the hematoporphyrin derivative can be excited either by the light B or ultraviolet light, so that the arrangement of the rotary filter 50 may be such as shown either in FIG. 4 or FIG. 9.

Figure 11:
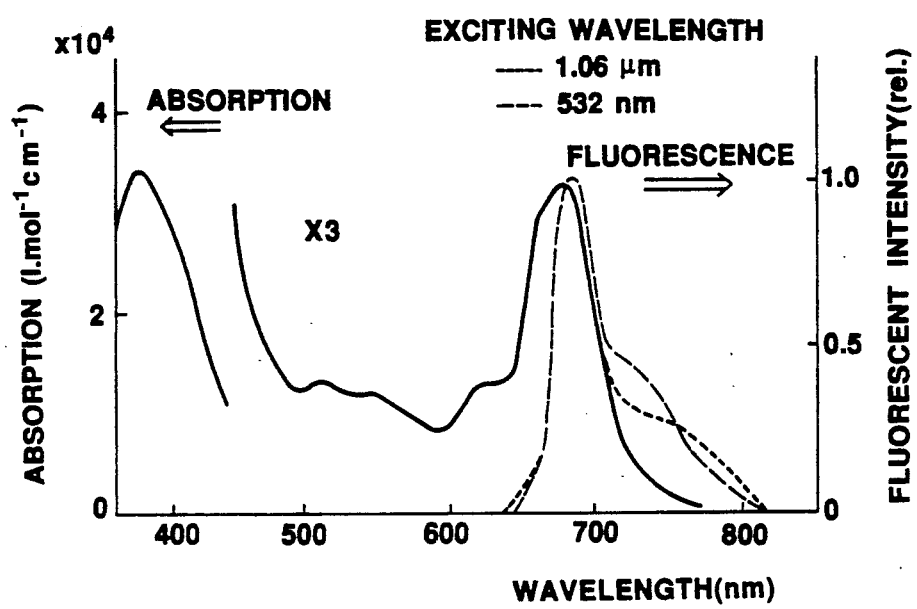
FIGS. 11 and 12 relate to a third embodiment of the invention.
Figure 12:
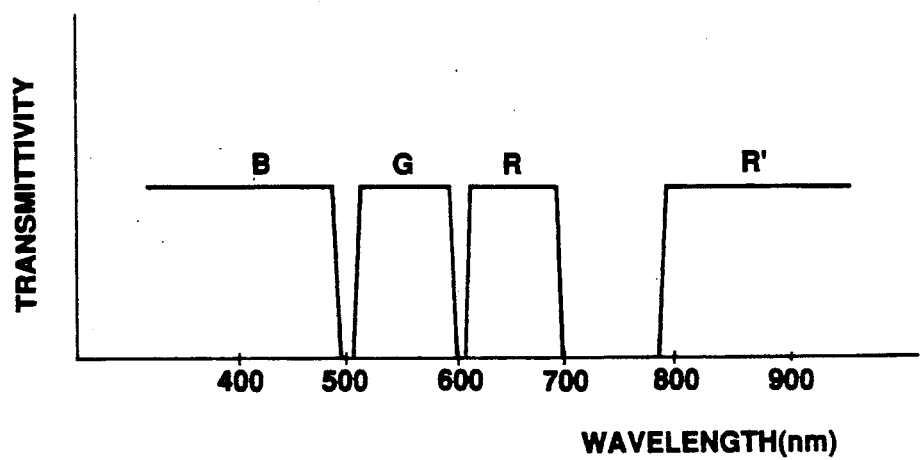

FIGS. 11 and 12 show a third embodiment according to this invention.

This third embodiment is suitable when using pheophorbide a having such absorption and fluorescence characteristics as shown in FIG. 11 as a fluorescent substance.

It is known, as shown in FIG. 11, that pheophorbide a can fluoresce upon excitation made either by ultraviolet light or infrared light. This fact is disclosed, for example, in "Basic Research on the Optical Effect of Pheophorbide a by Irradiation of Nd:YAG Laser Beam," *"Journal of Japan Society of Laser Medicine,* Vol. 6 No. 3, published in January 1986. In the figure, the solid line indicates the absorption characteristic, whereas the two broken lines indicate the fluorescence intensities in cases where fluorescence is excited by a wavelength of 532 nm and by an Nd:YAG laser beam (1.06 μm) used as infrared light. The conditions are such that the density of pheophorbide a is $1 \times 10^{-4}$ mol·l$^{-1}$; the solvent is PBS; and the resolution is 2 nm.

In order that pheophorbide a can be excited either by ultraviolet light or infrared light, the characteristic of the rotary filter 50 is made such that, as shown in FIG. 12, the filter which transmits R also transmits R′ in the infrared light range, and the filter which transmits B also transmits ultraviolet light.

When a wavelength is limited by the filter 51a of the wavelength limiting filter unit 51, in this embodiment as is the case with the second embodiment, it is possible to observe the ordinary color image formed by field-sequential irradiation of the ordinary light rays R, G, B.

When the filter 51b of the wavelength limiting filter unit 51 is selected, the object to be imaged is irradiated sequentially by the light rays R including infrared light R′, G, and B including ultraviolet light. If pheophorbide a is excited by infrared light, a change in the fluorescent substance is observed as a change in the image R, and further, since exciting light (infrared light) reaches a depth of the organic mucous membrane, information about the deep part of the mucous membrane can be obtained.

If pheophorbide a is excited by light transmitted through the filter B, a change in the fluorescent substance is observed and measured as a change in the image B, and information of the surface of the mucous membrane can be obtained.

Thus, by observing and measuring a sequential change in an image to be formed by the light rays being transmitted through the respective filters of the rotary filter 50 which serve to cause an excitation, it is possible to identify the change in the fluorescent substance in the direction of depth.

It is further possible, by calculating the difference between a change in the color tone caused by B and a change in the color tone caused by R, to compare changes in the surface and depth of the mucous membrane.

Other operation and advantages remain the same as the first embodiment.

Figure 13:
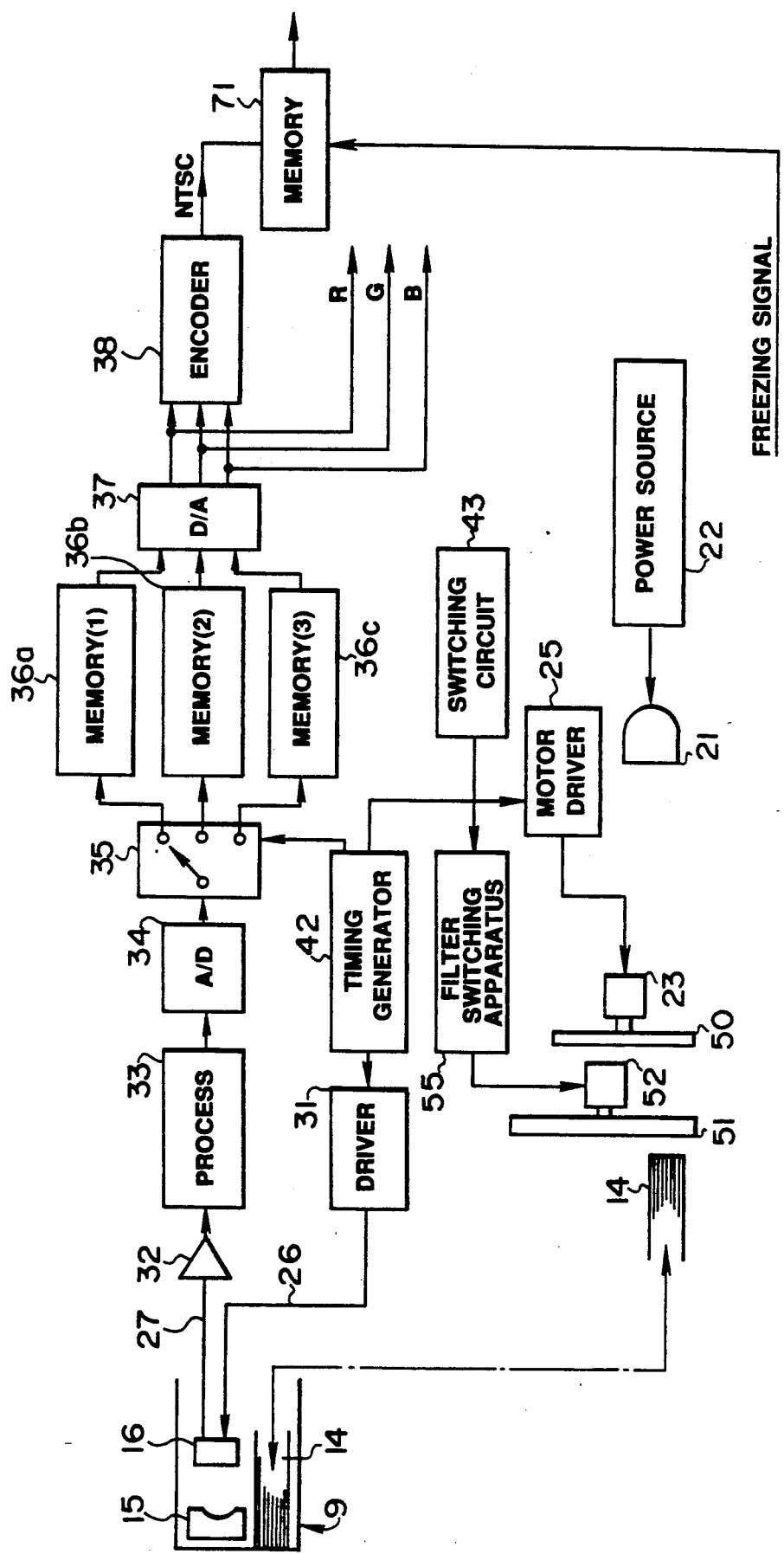
FIG. 13 is a block diagram showing the constitution of an endoscopic device according to a fourth embodiment of the invention.

FIG. 13 shows a fourth embodiment according to this invention.

This fourth embodiment is provided, in the downstream stage of the encoder 38 of the first embodiment, with a memory circuit 71 which causes the image to be frozen (stationary) upon input of a freezing signal, the arrangement thereof being the same as the first embodiment.

This embodiment gives a freezing signal to the memory circuit 71 by a commanding means (not shown) when it is necessary to freeze an image during observation and measurement of the sequential data, whereby the image is frozen, and the frozen image is displayed on an observing monitor to which a memory circuit 71 output is supplied. On the other hand, in an observation or recording file, where inputs of the signals R, G, B from the D/A converter 37 are stored, it is possible to record a sequentially changing image.

As a memory for freezing, a memory for the signals R, G, B may be provided rather than for the NTSC signal.

The monitor may be arranged such that a pair of image data, the image data before and after the change, can be displayed by introducing a master-slave display system.

Figure 14:
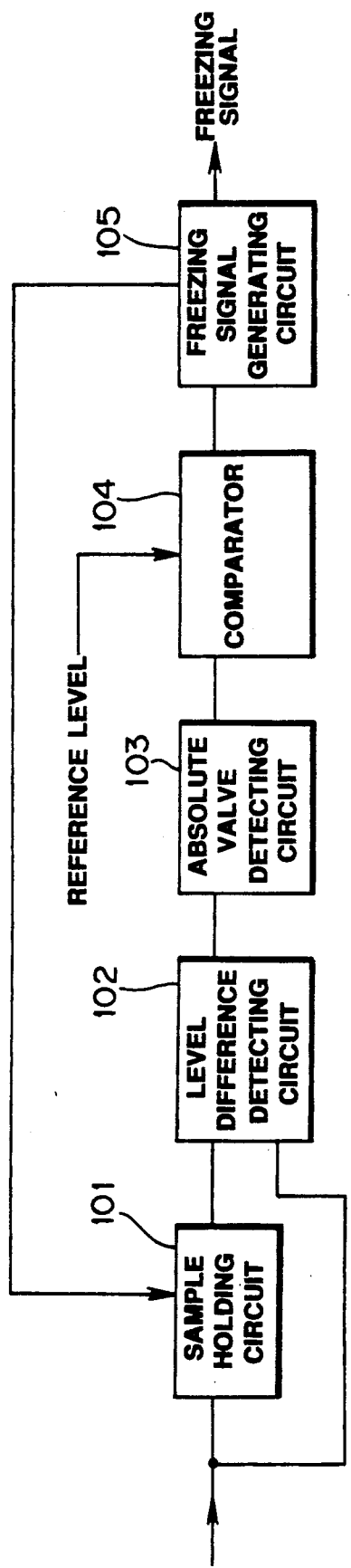
FIG. 14 relates to a fifth embodiment of the invention and is a block diagram showing a circuit for generating a freezing signal in accordance with an amount of change made in measured data.

FIG. 14 shows a fifth embodiment according to this invention.

This fifth embodiment enables data having a certain change to be recorded by generating a freezing signal in accordance with an amount of change made in the measured data.

In this embodiment, output data for measurement from the selector 68 of a circuit shown in FIG. 7 is directed to a branched circuit shown in FIG. 14. This latter circuit comprises a sample holding circuit 101 into which the data for measurement is supplied, a level difference detecting circuit 102 which detects a difference in level between the output of the sample holding circuit 101 and the current data for measurement, an absolute value detecting circuit 103 which detects an absolute value of the output of the level difference detecting circuit 102, a comparator 104 which compares the output of the absolute value detecting circuit 103 with a reference level, and a freezing signal generating circuit 105 which generates a freezing signal in accordance with the output of the comparator 104.

The sample holding circuit 101 temporarily holds the data in which a change in the color tone of an organic image observed by the effect of the fluorescent substance is measured. The level difference detecting circuit 102 detects an amount of change in the data held by the sample holding circuit 101. The absolute value detecting circuit 103 obtains an absolute value of the amount of change measured in the data detected by the level difference detecting circuit 102, and the comparator 104 compares the absolute value of the amount of change with the preset reference level. When the amount of change measured in the data is greater, not only a freezing signal is generated by the freezing signal generating circuit 105 into which the output of the comparator 104 is supplied, but also the data in the sample holding circuit 101 is changed to data at the time of generating the freezing signal.

Thus, according to this embodiment, when an amount of change in the color tone of the organic image observed by the effect of the fluorescent substance exceeds a prescribed level, a signal such as a freezing signal or a releasing signal is given.

Thus, it is possible to record the data having a certain change without making any sequential data at a certain interval, thereby allowing the recording medium to be saved.

This embodiment may be applicable to any one of the first to the fourth embodiments, the other arrangements and advantages of which remain the same as those of the first to the fourth embodiments.

FIGS. 15 to 18 show a sixth embodiment according to this invention.

In this sixth embodiment, there is an addition of the following arrangement to the endoscopic device according to the first embodiment shown in FIG. 1.

Figure 15:
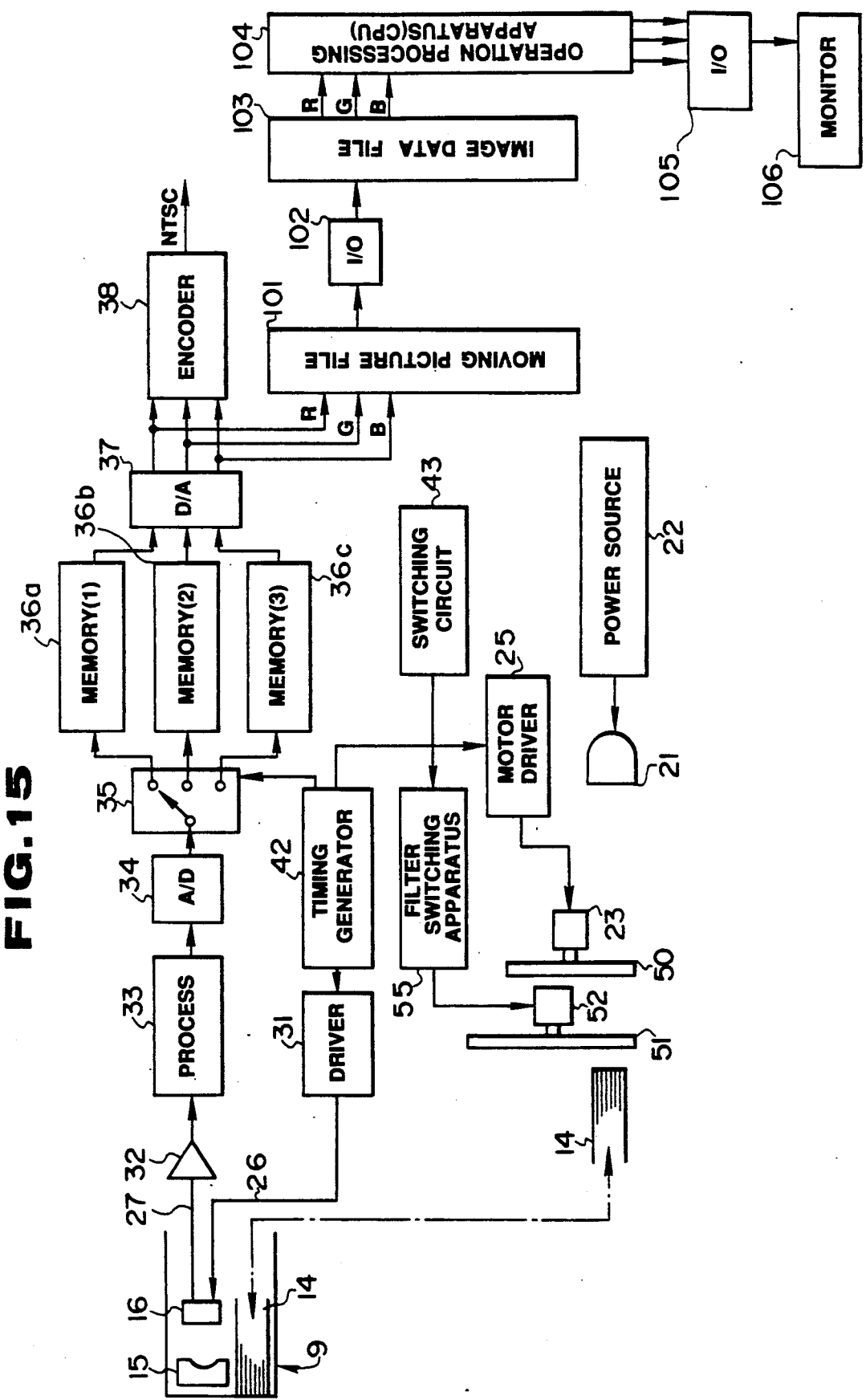
FIGS. 15 to 18 relate to a sixth embodiment of the invention.

That is, as shown in FIG. 15, an endoscopic device according to the sixth embodiment is arranged so that the output, color signals R, G, B from the D/A converter 37 are taken up and stored in a moving picture file 101. This moving picture file 101 may take up a moving picture continuously or only at a prescribed interval. It is further arranged so that the image stored in this moving picture file 101 is supplied to an image file 103 through an I/O interface 102 and stored. This image data file 103 picks up, for example, an image of the moving picture file 101 at approximately every 1 second and stores it in digitized form. It is further arranged so that the color signal data R, G, B from the image data file 103 is supplied to a central processing unit (CPU) 104, where it is subjected to a prescribed enhancing process and then supplied to a monitor 106 through an I/O interface 105. It is arranged, further, so that in this monitor 106, the enhanced endoscopic image is displayed.

Figure 16:
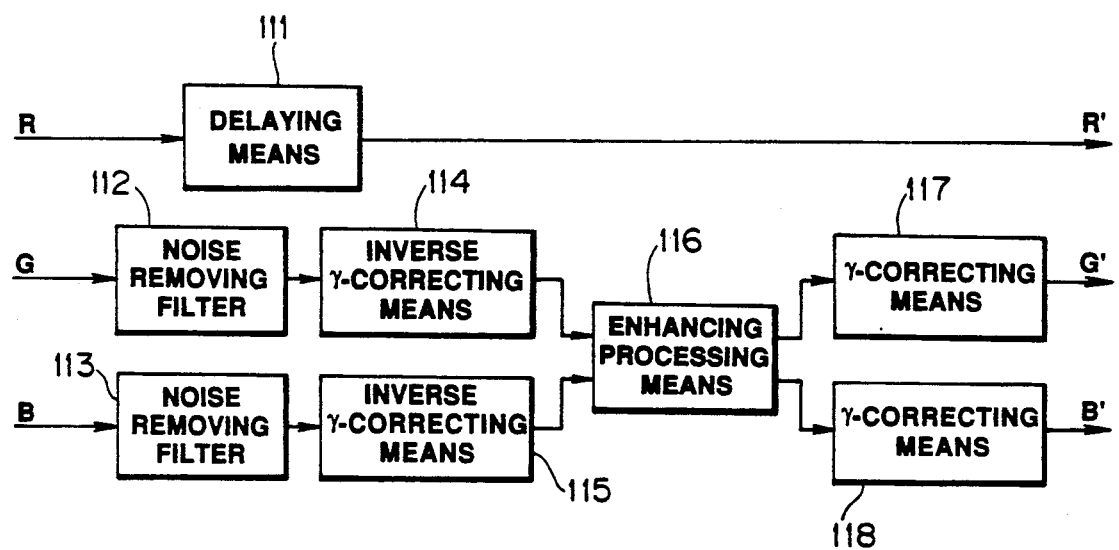
Figure 17A:
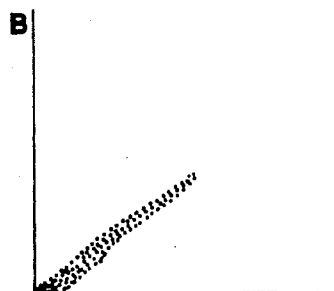
Figure 17B:
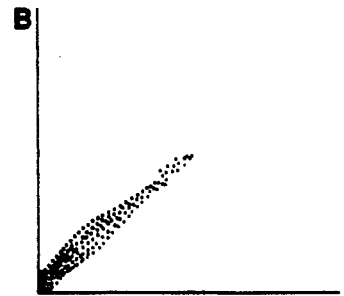
Figure 17C:
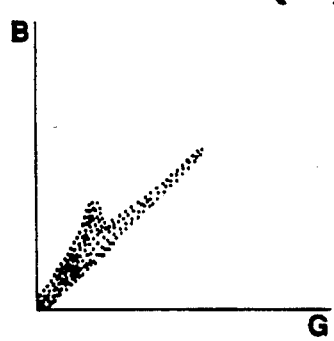
Figure 17D:
Figure 18A:
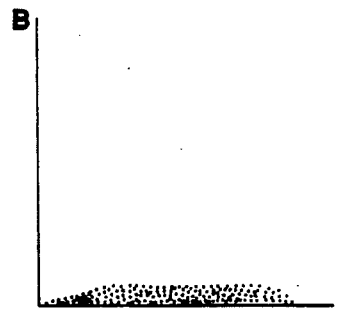
Figure 18B:
Figure 18C:
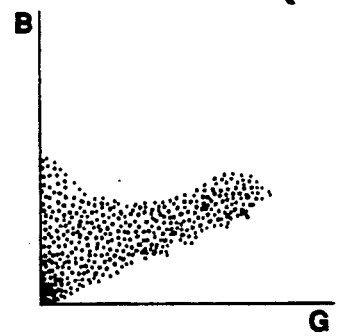
Figure 18D:
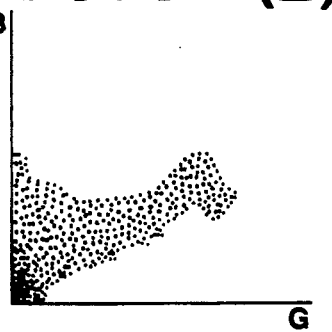

The central processing unit 104 has a functional configuration as shown in FIG. 16.

That is, its input signals G, B are respectively supplied to noise removing filters 112, 113 to remove noise therefrom. The noise removing filters 112, 113 are made up, for example, of a median filter, serving to remove noise and halations. The outputs of the noise removing filters 112, 113 are respectively supplied to inverse γ-correcting means 114, 115. These inverse γ-correcting means 114, 115 are so arranged as to raise its inputs to 2.2 power, for example, in order to cause the density tone to be γ=1. The outputs of the inverse γ-correcting means 114, 115 are supplied to enhancing processing means 116. This enhancing processing means 116 is so arranged as to perform a matrix operation such as:

$$\begin{pmatrix} G' \\ B' \end{pmatrix} = \begin{pmatrix} (1+C)/2, & (1-C)/2 \\ (1-C)/2, & (1+C)/2 \end{pmatrix} \begin{pmatrix} G \\ B \end{pmatrix} \quad (1)$$

In the equation (1), C is the constant, which is arbitrarily adjustable. It can, for example, be set to 5.

The output signals G', B' of the enhancing processing means 116 are respectively supplied to γ-correcting means 117, 118. These γ-correcting means 117, 118 serve to convert the density tone to γ=0.45, which is a density tone for displaying.

Further, the input signal R is supplied to delaying means 111, which causes the signal R to be delayed for a period of time required for the above-mentioned processing for the signals G, B so that it can be supplied as an output signal R'.

The signal R' and the signals G', B' from the γ-correcting means 117, 118 become the outputs of the central processing unit 104.

Other arrangements are the same as in the first embodiment.

There now follows a description of the effects according to this embodiment.

When a wavelength is limited as shown in FIG. 5 by the filter 51a of the wavelength limiting filter unit 51, the wavelengths of the light rays to be emitted are sequentially limited by the rotary filter 50, color-separated into light rays R, G, B in respective wavelengths as shown in FIG. 4. These color-separated light rays are sequentially irradiated to the surface of an organic mucous membrane, and by these light rays, an ordinary color image in the visible light range is obtained.

If a phleboclysis of a fluorescent substance such as fluorescein having absorption and fluorescence characteristics such as shown in FIG. 6 is made during observation of an organic mucous membrane on the ordinary color image, the density of fluorescein in the blood changes as time elapses. Such a change depends on the change in the bloodstream and the blood volume.

Fluorescein has an absorption characteristic almost coincident with the wavelength range of light ray B as shown in FIG. 6 and produces fluorescence of the wavelength range of light ray G by absorbing the light ray B. Thus, when the light rays R, G, B in the respective wavelength ranges are sequentially irradiated by the rotary filter 50, there is weaker fluorescence at the time of irradiating the light rays R, G than at the time of irradiating the light ray B. That is, if the density of fluorescein in the mucous membrane is high, the mucous membrane fluoresces; however, in signal processing, it is at the time of processing the light ray B when the fluorescence is emitted, and as a result, emission of fluorescence by the mucous membrane is processed as a change in the image B with no reference to wavelengths of such fluorescence. In other words, a proportion of B in the color image is increased by fluorescence. Thus, a change in color tone may provide an opportunity to observe a fluorescein density distribution and its sequential change.

In this embodiment, it is not always required that the wavelength limiting filter unit 51 be switched to the filter 51b side when observing fluorescence. Nor is the wavelength limiting filter unit 51 always required.

In this embodiment, images R, G, B are supplied to the moving picture file 101, the I/O interface 102, the image data file 103, and to the central processing unit 104. The central processing unit 104 processes so that the difference between the video signal levels of the light rays G, B is increased by the matrix operation shown in the equation (1). That is, the data distribution on a plane of G, B is extended having a direction where there is a negative correlation between G and B as an axis of extension. Signals G', B' which have been processed and a signal R' which has not been processed but delayed are supplied to the monitor 106 to be displayed as an enhanced endoscopic image.

There will now be explained, as an example, a chronological change in fluorescence in an object to be examined such as a large intestine to which a phleboclysis of fluorescein has been made.

As previously described, fluorescence is observed as an increase in the density value of the image B in this embodiment. FIGS. 17 (a) to (d) are two-dimensional histograms for G and B in an endoscopic image taken before making the phleboclysis of fluorescein, and 36 seconds, 41 seconds, and 46 seconds after making the phleboclysis of fluorescein. The horizontal axis indicates the density value of G, whereas the vertical axis indicates the density value of B. As shown in FIG. 17 (a), the histogram taken before making the phleboclysis of fluorescein indicates that there is a strong positive correlation between G and B, indicting further that it is identical to a histogram for G and B in an ordinary endoscopic image. However, as shown in FIGS. 17 (c), (d), each of the histograms taken 41 seconds and 46 seconds after making the phleboclysis when fluorescence has been produced indicates a branch which diverts upwards from the main distribution. This branch indicates the presence of a portion of the density value of B which is relatively large compared to that of the density value of G, and it is assumed that the data of a portion where there is stronger fluorescence has been plotted in the upper region.

FIGS. 18 (a) to (d) are two-dimensional histograms for G and B of an endoscopic image which has been taken before making a phleboclysis of fluorescein, and 36 seconds, 41 seconds, and 46 seconds after making a phleboclysis of fluorescein and then enhanced according to the equation (1).

Figure 19:
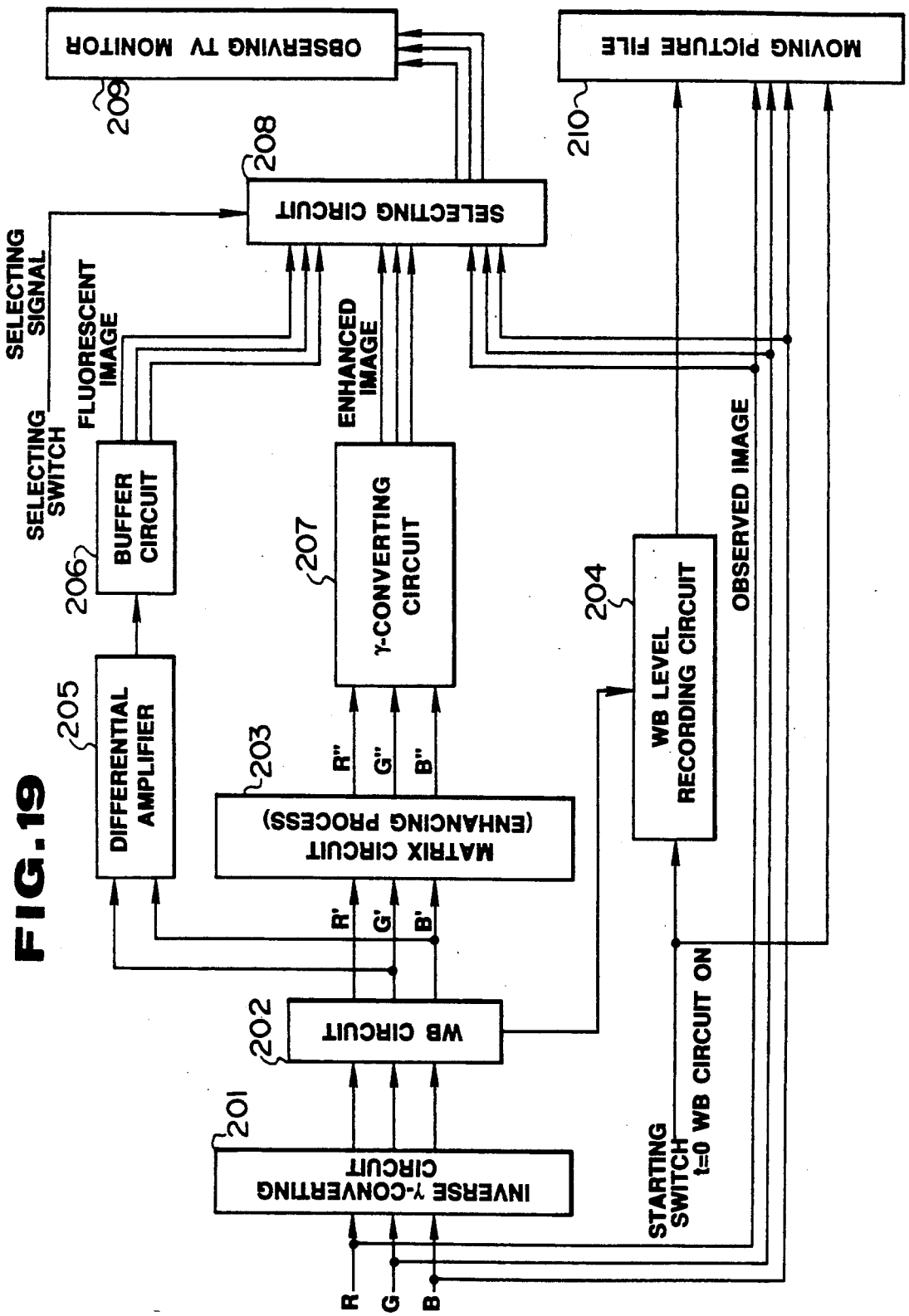

Since the density value of B is slightly larger than that of G almost uniformly over the entire region of the image before it has fluoresced, the image tends to be yellowish in its entirety as a result of undergoing an enhancing process, and, as shown in FIG. 18 (a), B decreases whereas G increases. When there is fluorescence, the density value of G increases, whereby, as a result of the enhancing process, the portion where fluorescence has been produced rapidly changes its color toward red. That is, G decreases whereas B increases. This is known from the fact that the data distribution is extended toward a negative correlation between G and B, as shown in FIGS. 19 (c), (d).

Thus, according to this embodiment, field-sequentially illuminated light rays R, G, B including the wavelength range of B adjacent to the fluorescein absorption wavelength range are irradiated to the object to be examined and an enhancing process is made so that the difference in the video signal level between the wavelength range of B adjacent to the fluorescein absorption wavelength range and a wavelength range of C which is different from the wavelength range of B is increased, whereby it is possible to observe fluorescence more accurately. In contrast thereto, when making an enhancing process to a wavelength range of fluorescein-based fluorescence in an endoscopic image obtained by an endoscope which is of the simultaneous illumination type, fluorescence becomes more or less red, so that it is difficult to give a relative difference between fluorescence and the original red of the object, and thus the enhancing process is not advantageous.

Thus, according to this embodiment, it is possible to observe and measure more accurately a sequential change in fluorescence-based information, for example, a timewise change in the distribution of a fluorescent substance on a mucous membrane to which a phleboclysis of the fluorescent substance has been made.

It is further possible to improve quality of observing any lesion as well as quality of diagnosis by observing or measuring a sequential change in a mucous membrane after making a phleboclysis of fluorescein to the mucous membrane, especially a sequential change in the image B and other images G, R, which allows circulation behavior of the organic mucous membrane to be grasped.

Moreover, according to this embodiment, fluorescence-based information can be observed as a change in the color tone of an image although fluorescence produced by the fluorescent substance is not present in the range of visible light.

The method of enhancing may not be limited to a matrix operation, but may be such that the data distribution in a color space or a chromaticity diagram is extended. The enhancing process may be made also on a hardware basis.

FIGS. 19 to 22 show a seventh embodiment according to this invention.

In this seventh embodiment there is an addition of a processor shown in FIG. 19 to the endoscopic device according to the first embodiment shown in FIG. 1.

That is, an endoscopic device according to the seventh embodiment is so arranged that the video signals of R, G, B supplied from the D/A converter 37 shown in FIG. 1 are subjected to processing by the inverse $\gamma$-converting circuit 201 so that their input-output relation is made linear, and are then supplied to a white balance circuit 202 (hereinafter referred to as WB circuit). The WB circuit 202 makes a white balance between B and G so that the effect to be made by a downstream matrix circuit 203 can be maximized; for example, the inclination of a line indicating the correlation between B and G in FIG. 20 (A) can be 45 degrees as in FIG. 20 (B), that is, to make the levels of the video signals of B, G equal.

The white balance to be made by the WB circuit 202 is activated by a start switch (not shown) provided on the operating section 3 of the endoscope 1, based on a timing, t=0 (a reference time, for example, before making a phleboclysis of fluorescent substance). The difference between the video signal levels of B and G necessary to make a white balance is recorded in the moving picture file 120 by the WB level recording circuit 204.

The signals R, G, B to be supplied from the WB circuit 202 (denoted as R', G', B') are supplied to the matrix circuit 203, where they are subjected to enhancing process, for example, by the matrix calculation indicated in the equation (1) in the sixth embodiment so that the difference between G and B is increased. The video signals G', B' which have been subjected to white balance by the WB circuit 202 are also supplied to a differential amplifier 205. This differential amplifier 205 calculates the difference between the video signal levels B' and G'.

Fluorescence produced by fluorescein as a result of making a phleboclysis of fluorescein as a fluorescent substance causes a change in the image B. In order to visualize only a portion of such a change, a difference in the video signal level between the image B and the image G which have been subjected to a white balance process is obtained by the differential amplifier 205. This is also a change relative to the images B, G at t=0, thus, only the fluorescent image based on fluorescein can be visualized. The fluorescent image from the differential amplifier 205 is processed by a buffer circuit 206 into a monochromatic signal, that is, R=G=B output signal, and supplied to a selecting circuit 208.

On the other hand, the video signals which have been enhanced by the matrix circuit 203 are supplied to a $\gamma$-correcting circuit 207, $\gamma$-converted for displaying on a monitor, and supplied to the selecting circuit 208.

The observed image which has been subjected to a D/A conversion by the D/A converter 37 is also supplied to the selecting circuit 208.

The selecting circuit 208 makes a selected output out of the fluorescent image, the enhanced image, and the observed image which have been supplied thereto, in accordance with the selecting signal from a selecting switch (not shown) provided on the processor shown in FIG. 19. The selected image is then supplied to an observing TV monitor 209, on which an image required by an observer is observed.

The observed image is also recorded in the moving picture file 120 together with its white balance level at t=0.

Thus, by making a white balance for the images G, B at t=0 as a process prior to the enhancing by the matrix circuit 203, it is possible to accurately observe a chronological change of fluorescence produced by the fluorescein whose phleboclysis has been made.

In the moving picture file 210, the observed image is recorded together with the white balance level at t=0, which enables various enhancing processes to be performed also at the time of reproduction, whereby it provides an opportunity for a more general-purpose image data recording.

Furthermore, the selecting circuit 208 selects any image out of fluorescent images in which only fluorescent substance-based fluorescent images can be observed, enhanced images in which color images have been enhanced, and ordinary observed images. This provides an opportunity to select an image most suitable for the purpose of the diagnosis, and thus it helps improve the quality of diagnosis.

In the case where a fluorescent image which allows only a fluorescent substance-based fluorescent image to be observed, a ratio of the images G, B may be obtained rather than a difference between them. In this case, the differential amplifier 205 shown in FIG. 19 may be replaced by, for example, a divider for calculating B/G.

Figure 22:
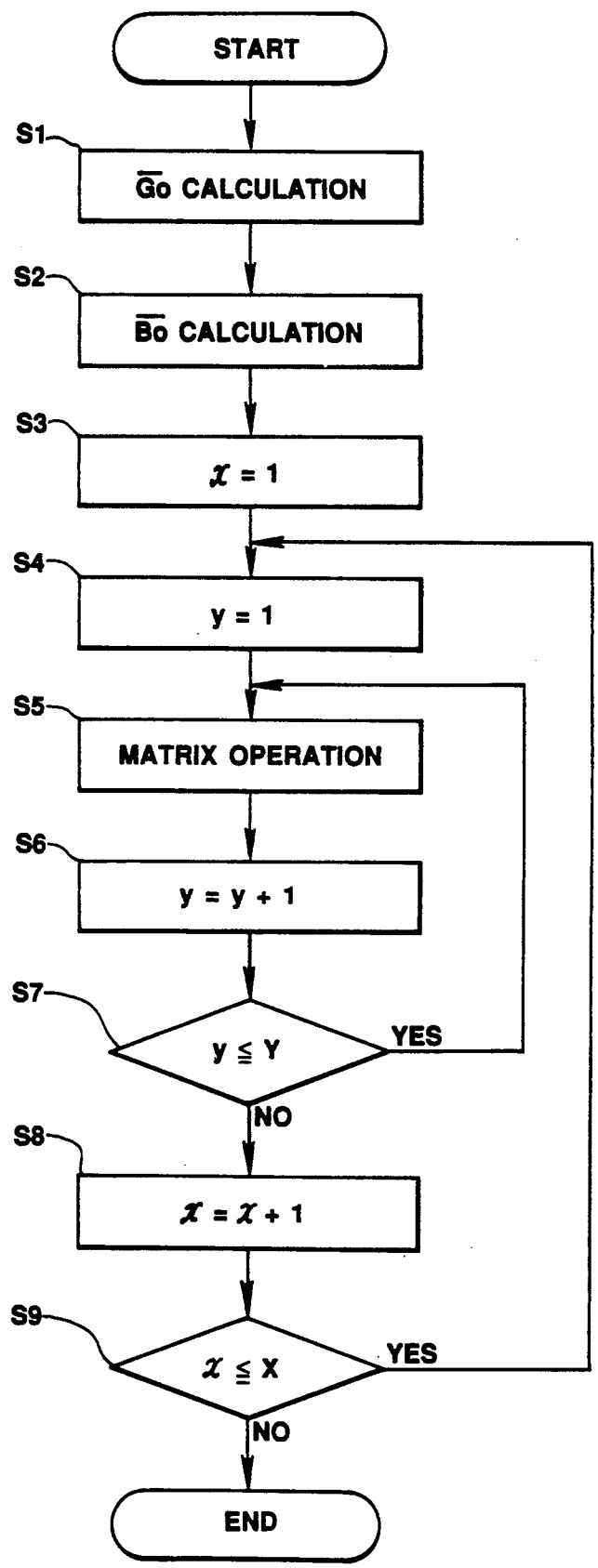

In FIG. 19 the enhancing process is performed on a hardware basis by the matrix circuit 203, however, it may be performed on a software basis as indicated by a modified embodiment shown in FIGS. 1 and 22.

Enhancing means 211 shown in FIG. 21 has a memory 212 and a CPU 213, and functions so that, for example, images from the inverse $\gamma$-converting circuit 201 are stored in the memory 212 and processed by the CPU 213.

Here, t is the time elapsed from a reference time, and Rt, Gt, Bt are the images taken after t second(s). These images are stored in the memory 212 and ready to be accessed by the CPU 213. Further, let X, Y be the size of the image, and let N be equal to X x Y. Let the values of R, G, B at a point whose coordinates in each of the images are (x, y) be Rt (x, y), Gt (x, y), Bt (x, y), respectively, provided that $1 \leq x \leq X$, $1 \leq y \leq Y$.

Based on the above denotation system, the operation of the CPU is indicated by the flowchart shown in FIG. 22 as well as by the following equations.

First, the mean values $\overline{G_0}$, $\overline{B_0}$ of $G_0$, $B_0$, or $Gt$, $Bt$ at a reference time (t=0), are calculated in steps S1 (hereinafter referred to simply such as S1 by omitting the word "step") and S2.

The mean values of Rt, Gt, Bt are calculated from the following equations.

$$\overline{Rt} = (1/N) \sum_x \sum_y Rt(x, y)$$

-continued $$\overline{Gt} = (1/N) \sum_x \sum_y Gt\,(x,\,y)$$

$$\overline{Bt} = (1/N) \sum_x \sum_y Bt\,(x,\,y)$$

Then, let x be equal to 1 in S3. Then, let y be equal to 1 in S4. Then, a matrix operation is made in S5, in which the following equations (2), (3), or (4) are employed, where:

$$k = \overline{G_0}/\overline{B_0}$$

and let it be supposed that the coordinates of a point in each of the images after the matrix operation are as follows:

$$eRt\,(x,\,y),\ eGt\,(x,\,y),\ eBt\,(x,\,y)$$

then, $$\begin{pmatrix} eRt\,(x,y) \\ eGt\,(x,y) \\ eBt\,(x,y) \end{pmatrix} = \begin{pmatrix} 1 & 0 & 0 \\ 0 & (1+C)/2 & (1-C)k/2 \\ 0 & (1-C)/2k & (1+C)/2 \end{pmatrix} \begin{pmatrix} Rt\,(x,y) \\ Gt\,(x,y) \\ Bt\,(x,y) \end{pmatrix} \quad (2)$$

$$\begin{pmatrix} eRt\,(x,y) \\ eGt\,(x,y) \\ eBt\,(x,y) \end{pmatrix} = \begin{pmatrix} 1 & 0 & 0 \\ 0 & (1+C)/2 & (1-C)k/2 \\ 0 & (1-C)/2 & (1+C)k/2 \end{pmatrix} \begin{pmatrix} Rt\,(x,y) \\ Gt\,(x,y) \\ Bt\,(x,y) \end{pmatrix} \quad (3)$$

$$\begin{pmatrix} eRt\,(x,y) \\ eGt\,(x,y) \\ eBt\,(x,y) \end{pmatrix} = \begin{pmatrix} 1 & -(1-C)/2 & (1-C)k/2 \\ 0 & (1+C)/2 & (1-C)k/2 \\ 0 & (1-C)/2k & (1+C)/2 \end{pmatrix} \begin{pmatrix} Rt\,(x,y) \\ Gt\,(x,y) \\ Bt\,(x,y) \end{pmatrix} \quad (4)$$

Here, C is the coefficient defining the degree of enhancing.

The converting equation (3) converts the mean values of the images B, G so as to be in coincidence with each other at the time of observation start time, that is t=0, and further serves to increase the difference between the value of the image G and that of the image B in various points in the respective images.

Further, by adding to the effect brought about by the above equation (3) an inverse conversion of the previously described conversion which brings the mean values of the images G and B into coincidence with each other, the converting equation (2) serves not only to increase the difference between the value of the image G and the value of the image B in various points in the respective images but also to control the change in the color tone of a portion which is not changed.

The converting equation (4) serves to improve the enhancing effect by adding to the value of the image R a difference between the value of the image G and the value of the image B, in addition to the effect brought about by the equation (2).

Then, let y be equal to y+1 in S6.

Then, a determination is made whether y≦Y in S7. If the answer is YES, the operation returns to S5 for further matrix operation for another point. On the other hand, if the answer is NO, let x be equal to x+1 in S8.

Then, whether x≦X is determined in S9. If the answer is YES, the operation returns to S4 for further matrix operation with y=1 for another point. On the other hand, if the answer is NO, the operation ends.

Thus, the matrix operation is performed for all the points in each of the images.

This modified embodiment may be applied also to the sixth embodiment. In other words, the image data for R, G, B from the moving picture file 103 in FIG. 15 may be subjected to the above enhancing process by the enhancing means shown in FIG. 21 after making the inverse γ-conversion.

Other arrangements, operation, and advantages are the same as the first embodiment.

The present invention may not be limited to the above embodiments, but may use various fluorescent substances other than shown in the embodiments. In such a case, as far as transmission characteristics of the respective filters of the rotary filter may be modified in accordance with absorption and fluorescence characteristics of a fluorescent substance to be used, and field-sequential light rays including one in the absorption wavelength range of the fluorescent substance to be used are irradiated to an object to be examined, it is possible to observe fluorescence as a change in the color tone.

The present invention may be applied, not only to an electronic endoscope having a solid state imaging device on the tip of an inserting portion, but also to an endoscope, wherein a TV camera is connected to an ocular portion of the endoscope enabling visual observation such as a fiberscope, or a TV camera is connected to the endoscope in place of the ocular portion.

As described above, according to the present invention, it is possible not only to make an ordinary observation but also to obtain information based on fluorescence produced by a fluorescent substance with a simple constitution, whereby it is advantageous in that a chronological change in the fluorescence-based information can be observed.

Moreover, by making an enhancing process in such a manner that a difference between a level of component in a wavelength range in which the degree of exciting a fluorescent substance is largest and a level of component in other wavelength ranges can be increased, it is possible to help observe fluorescence accurately.

It is obvious in this invention that many widely different embodiments may be made based on this invention without departing from the spirit and scope thereof. It is to be understood that this invention is not limited by the specific embodiments thereof except as defined in the appended claims.

What is claimed is:

1. A fluorescence endoscopy comprising the steps of:
sequentially irradiating, to an object to be examined containing a fluorescent substance, light rays in a plurality of wavelength ranges whose degrees of exciting said fluorescent substance are different from one another and which can constitute a color image;
obtaining images of said object to be examined to which said light rays have been irradiated by said respective wavelength ranges;
constituting a color image of said object to be examined using said images obtained of said object;
obtaining a color picture image as first light information about said object to be examined by the light rays of the wavelength range having a largest degree of exciting said fluorescent substance among said light rays irradiated, said first light information including a fluorescence information component other than a reflected light information component of said object;

obtaining said reflected light information component of said object as second light information about said object to be examined by the light rays of the wavelength ranges other than the wavelength range for obtaining said first light information among said light rays irradiated; and obtaining fluorescence-based information about said object to be examined based on said first light information and said second light information by a) comparing said first and second light information and b) making said fluorescence information component conspicuous in said reflected light information component of said object which is to be examined in said first light information.

2. A fluorescence endoscopy according to claim 1, wherein at least one of said light rays in said plurality of wavelength ranges to be irradiated by said step of irradiating light rays includes a light ray which excites said fluorescent substance in wavelength ranges other than a wavelength range of visible light.

3. A fluorescence endoscopy according to claim 1, wherein said step of obtaining fluorescence-based information includes a step of adjusting said first light information level and said second light information level so as to be equal to each other at a reference time and obtaining said fluorescence-based information at a predetermined time by the difference between said levels adjusted by said adjusting step.

4. A fluorescence endoscopy according to claim 1, wherein said step of obtaining fluorescence-based information includes a step of adjusting said first light information level and said second light information level so as to be equal to each other at a reference time and said difference expanding step expands the difference between said levels adjusted by said adjusting step.

5. A fluorescence endoscopy according to claim 1 further comprising a step of switching between said color image obtained by said step of constituting a color image and said fluorescence-based information obtained by said step of obtaining fluorescence-based information and forming an output thereof.

6. A fluorescence endoscopy according to claim 1 wherein said step of obtaining fluorescence-based information includes a step of continuously displaying said fluorescence-based information so that a variation with a lapse of time of the fluorescence-based information may be recognized.

7. A fluorescence endoscopy according to claim 1 includes a step of displaying light information obtained by said step of comparing and calculating.

8. A fluorescence endoscopy according to claim 1 wherein said step of comparing and calculating includes a step of calculating a difference between respective levels of said first and second light information.

9. A fluorescence endoscopy according to claim 8 wherein said step of comparing and calculating includes a step of calculating and expanding said difference between the levels.

10. A fluorescence endoscopy according to claim 1 wherein said step of comparing and calculating includes a step of expanding a negative correlation between said first and second light information.

11. A fluorescence endoscopy according to claim 10 wherein said step of expanding can vary an expanding level.

12. A fluorescence endoscopy according to claim 11 wherein said step of expanding is carried out by a matrix converting means supplied with the first and second light information.

13. A fluorescence endoscopy according to claim 1 wherein said step of irradiating sequentially irradiates light of three colors of red, green and blue.

14. A fluorescence endoscopy according to claim 13 wherein said first light information is obtained when an examined object is irradiated by a blue light as a light ray and said second light information obtained when the examined object is irradiated by a green light as a light ray.

15. A fluorescence endoscopy according to claim 1 wherein said step of comparing and calculating further normalizes said fluorescence information by information of a quantity of blood obtained when the object is irradiated by a red light as said light ray for canceling an effect of a large or small quantity of blood from said fluorescence information.

16. A fluorescence endoscopy according to claim 15 wherein said information of the quantity of blood is supplemented by said second light information.

17. A fluorescence endoscopic device for obtaining information about fluorescence comprising:

an endoscopy body having a thin, long inserting portion including an observing window at a tip thereof and an image forming optical system which forms an image by receiving a light ray entered from said observing window;

an irradiating means for sequentially irradiating, to an object to be examined containing a florescent substance, light rays in a plurality of wavelength ranges whose degrees of exciting said fluorescent substance are difference from one another and which can constitute a color image;

an imaging means for receiving an image formed by said image forming optical system, and for obtaining images of said object to be examined to which said light rays have been irradiated by said irradiating means, by said respective wavelength ranges;

a signal processing means for constituting a color image of said object to be examined using said images by said respective wavelength ranges obtained by said imaging means;

a first detecting means for obtaining first light information about said examined object by light of the wavelength range having a largest degree of exciting said fluorescent substance among said light irradiating by said irradiating means, said first light information including a fluorescence information component other than a reflected light information component of said object;

a second detecting means for obtaining said reflected light information component of said object as second light information about said examined object by the light of the wavelength ranges other than the wavelength range for obtaining said first light information among said light irradiated by said irradiating means; and a comparing and calculating means for comparing levels of said first and second light information obtained by said first and second detecting means and for calculating to make said fluorescence information component conspicuous.

18. A fluorescence endoscopic device according to claim 17 further comprising means for switching between said color image obtained by said signal processing means and said fluorescence information component obtained by said comparing and calculating means and forming an output thereof.

19. A fluorescence endoscopic device according to claim 17 wherein said comparing and calculating means detects a difference between said first and second light information.

20. A fluorescence endoscopic device according to claim 19 wherein said comparing and calculating means has a function expanding said difference.

21. A fluorescence endoscopic device according to claim 20 wherein a means for expanding said difference comprises a matrix converting means which can control a degree of emphasizing.

22. A fluorescence endoscopic device according to claim 21, wherein said matrix converting means expands a negative correlation between said first and second light information.

23. A fluorescence endoscopic device according to claim 19 wherein said comparing and calculating means can control a relative level between said first and second light information which detects said difference.

24. A fluorescence endoscopic device according to claim 23, wherein said comparing and calculating means further includes an adjusting means for adjusting said first light information level and said second light information level to be equal to each other at a reference time, whereas said means for detecting a difference detects a difference between said levels adjusted by said adjusting means.

25. A fluorescence endoscopic device according to claim 17 wherein said first light information can be obtained when the object is irradiated by a blue light as a light ray and said second light information can be obtained when the object is irradiated by a green light as a light ray.

26. A fluorescence endoscopic device according to claim 17 said comparing and calculating means normalizes said fluorescence information by information of quantity of blood obtained when the object is irradiated by a red light as a light ray for canceling an effect of a large or small quantity of blood from said fluorescence information.

27. A fluorescence endoscopic device according to claim 26 wherein said information of the quantity of blood is supplemented by said second light information.

28. An endoscopic device, used with a fluorescent substance emitting fluorescence information having a color of longer wavelength ranges than blue light by receiving blue light, said endoscopic device comprising:
   irradiating means for sequentially irradiating, to an object to be examined, three color irradiating light of red, green and blue;
   detecting means for sequentially detecting reflected light of said object;
   obtaining means for obtaining picture images corresponding to respective irradiating light and for obtaining a color picture image by composing said images;
   emphasizing means for calculating and emphasizing said fluorescence information by comparing blue picture image information, corresponding to said blue irradiating light, with green picture image information corresponding to said green irradiating light; and
   a display means for displaying emphasized blue picture image information.

29. An endoscopic device according to claim 28 wherein said emphasizing means reduces a component other than a fluorescence component from the picture image corresponding to said blue irradiating light by detecting a difference of the picture image corresponding to the blue irradiating light from the picture image corresponding to the green irradiating light and makes a fluorescence information component conspicuous.

30. An endoscopic device according to claim 28 wherein said displaying means displays said emphasized blue picture image information by a single color.

31. An endoscopic device according to claim 28 wherein said displaying means displays color by overlapping said emphasized blue picture image information with said green picture image information and red picture image information corresponding to a red irradiating light.

32. A method for displaying fluorescence information by an endoscope comprising the steps of:
   receiving a blue light and injecting a fluorescent substance emitting fluorescence, of a higher wavelength than blue light, into a body;
   bringing an endoscopic device into a body cavity, said endoscopic device comprising an irradiating means for sequentially irradiating red, green and blue irradiating light into the body cavity and a receiving light means for receiving a light from an irradiated part;
   supplementing signals from said receiving light means by reducing a component other than a fluorescence component from a blue light by considering a signal when said green or red irradiating light irradiates compared with a blue signal when said blue irradiating light irradiates; and
   displaying a projected image relating to supplemented signals of said step of supplementing.

33. A method according to claim 32 wherein said step of supplementing reduces a component other than the fluorescence component by subtracting a signal at a time of irradiating the green or red light from the blue signal.

* * * * *